United States Patent [19]

O'Dea

[11] Patent Number: 5,606,578
[45] Date of Patent: Feb. 25, 1997

[54] RADIO WITH PEAK POWER AND BANDWIDTH EFFICIENT MODULATION USING ASYMMETRIC SYMBOL CONSTELLATIONS

[75] Inventor: Robert J. O'Dea, Ft. Lauderdale, Fla.

[73] Assignee: Motorola, Inc., Schaumburg, Ill.

[21] Appl. No.: 494,506

[22] Filed: Jun. 26, 1995

[51] Int. Cl.⁶ ................................ H04L 27/36
[52] U.S. Cl. .......................... 375/298; 375/296
[58] Field of Search ...................... 375/261, 295, 375/297, 298, 296; 370/110.1; 332/103

[56] References Cited

U.S. PATENT DOCUMENTS

| | | | |
|---|---|---|---|
| 4,891,806 | 1/1990 | Farias et al. | 370/110.1 |
| 5,377,194 | 12/1994 | Calderbank | 375/261 |
| 5,381,449 | 1/1995 | Jasper et al. | 375/295 |
| 5,394,440 | 2/1995 | Goldstein et al. | 375/265 |
| 5,406,588 | 4/1995 | Bircher et al. | 375/346 |

Primary Examiner—Tesfaldet Bocure
Assistant Examiner—T. Ghebretinsae
Attorney, Agent, or Firm—M. Mansour Ghomeshi

[57] ABSTRACT

A communication device (300) includes a digital modulator (301), a digital to analog converter (308), an RF mixer (310) (306), and an amplifier(312). The digital modulator (301) includes an information generator (304) and a signal processor (306). The processor responds (306) to the generator (304) by alternately mapping the digital information onto a first (502) or a second (504) constellation diagram to produce data symbols. The processor (306) processes the data symbols alternately from the first and second constellation diagrams (502, 504) in order to minimize the peak to average power ratio at the amplifier (312). This alternating scheme allows the power amplifier to operate more efficiently and thereby conserve precious battery energy.

8 Claims, 4 Drawing Sheets

CONSTELLATION DIAGRAM

ALTERNATE CONSTELLATION DIAGRAM

RADIO WITH PEAK POWER AND BANDWIDTH EFFICIENT MODULATION USING ASYMMETRIC SYMBOL CONSTELLATIONS

TECHNICAL FIELD OF THE INVENTION

This invention is generally related to communication devices and more particularly to communication devices with efficient modulation.

BACKGROUND OF THE INVENTION

Narrowband wireless communication systems require the transmitted signal spectrum to be compact in order to meet strict adjacent channel interference specifications. The pulse shape filters that are utilized to achieve such specifications generally possess relatively slow decaying impulse responses. These impulse responses generate substantial Inter Symbol Interference (ISI). In linear modulation schemes such as Quadrature Amplitude Modulation (QAM), the combination of this ISI and certain transmitted symbol sequences can create large local peaks in the transmitted signal envelope. Large local peaks equate to a large peak-to-average power ratio which in turn requires the transmitter power amplifier to operate at low efficiency.

Conventional 16-level QAM signaling (i.e. square signal constellation w/root raised cosine rolloff pulse shaping) has a peak-to-average power ratio of 8.24 dB and 6.6 dB for rolloff values of 0.2 and 0.35, respectively. Considering the theoretical efficiency limit of a Class AB amplifier these ratios would require the transmitter amplifier to operate at an efficiency of only 18 and 24%, respectively. This compares rather poorly with the 65% efficiency that can be attained with constant envelope modulation. In general, in one dimensional digital communication systems, the transmitted waveform is formed by adding time-shifted versions of a basic pulse shape. The amplitude of the individual pulses is adjusted according to the data being sent (e.g. binary phase shift keyed). Similarly, multi-dimensional digital communication systems (e.g. QAM) construct the transmitted waveform from multiple pulse streams that are generated according to the data. Most digital communication systems utilize a pulse shape that spans several symbol intervals to minimize the bandwidth of the transmitted waveform and thereby secure that the transmitted waveform does not interfere with other systems operating in a nearby (frequency) channel. The result of this pulse shaping is that the pulse associated with one data symbol will overlap pulses associated with adjacent data symbols. Certain data sequences will cause these overlapping pulses to add constructively and produce large peaks in the envelope of the transmitted waveform, while other data sequences will cause these overlapping pulses to cancel one another and produce small envelope values of the transmitted waveform. Amplifiers that are used to boost the power of the transmitted signal just prior to transmission work best when the signal remains at a fairly constant level. The severity of the signal envelope fluctuations is often quantified by the ratio of the peak-to-average signal power or peak-to-average power ratio. Large peaks in the transmitted signal lead to inefficient usage of the power amplifier which in turns wastes precious battery life.

Battery operated communication devices employ a variety of techniques to save battery energy in order to prolong the operating life of the battery. Increasing the efficiency of power amplifiers is just one technique. Another scheme by which battery energy may be saved is the use of a power-efficient modulation technique. Various modulation techniques have different associated peak-to-average power ratios. In general, it is highly desirable to have a peak-to-average ratio as close to zero dB as possible (e.g. FM). This minimizes the demand placed upon the amplifier to handle peak powers that are significantly larger than the average power. Thus allowing the amplifier to operate at a point of higher efficiency, and thereby reduce the energy drain on the battery. However, many existing modulation formats generate relatively high peak-to-average power ratios. Two commonly used modulation formats are Phase Shift Keying (PSK) and QAM. The former uses a signal constellation where all data symbols have the same magnitude while the latter varies both the phase and magnitude of the individual data symbols. Binary signaling is a special case of PSK (i.e. BPSK). In both modulation formats, the peak-to-average ratio depends upon the pulse shape used.

Quadrature Amplitude Modulation (QAM) utilizes both the phase and amplitude of a carrier to transmit information and hence has the potential to generate a higher peak-to-average power ratio. Indeed, experiments have demonstrated that, for example, a sixteen symbol PSK constellation enjoys a 3–4 dB advantage in peak-to-average power ratio over a 16 QAM signal. However, this gain in efficiency improvement is accompanied with a 4 dB loss in sensitivity. Due to this loss of sensitivity, many system designers prefer to use the QAM modulation format despite its degraded peak-to-average power ratio.

Referring to FIG. 1, a communication device is shown as is presently available. FIG. 2 shows a phase and magnitude trajectory of a complex baseband 8 PSK signal. In other words, this figure represents the transition from one data symbol to the next as the generated data changes state. A pulse shape filter that is used to limit the sideband noise produces undesirable overshoot as shown by reference 202. This overshoot 202 contributes to an increase in peak power which in turn increases the peak-to-average power ratio. This increase in the peak-to-average power ratio forces a designer to design an amplifier that can tolerate the maximum peak power which in turn renders the power amplifier more expensive to produce. In addition, the increase in peak-to-average ratio reduces the power efficiency of the power amplifier, thereby wasting battery life.

In the design of portable communication devices, the aim of a designer is to utilize efficient components at the lowest possible price. Power amplifiers have traditionally been some of the most expensive components of a communication device and have often resisted attempts aimed at lowering their cost. One parameter that is directly related to the cost of amplifiers is the peak-to-average power ratio. This is because the designer is forced to employ an amplifier that can handle peak powers significantly larger than the average power. It has therefore been the goal of designers to reduce peak-to-average power ratios as much as possible without degrading other performance parameters. There is therefore a need for a modulation scheme that would have minimum peak-to-average power ratio without suffering other performance degradation.

DETAILED DESCRIPTION OF THE PREFERRED EMBODIMENT

Figure 1:
FIG. 1 shows a block diagram of relevant elements of a communication device as is presently available.
Figure 2:
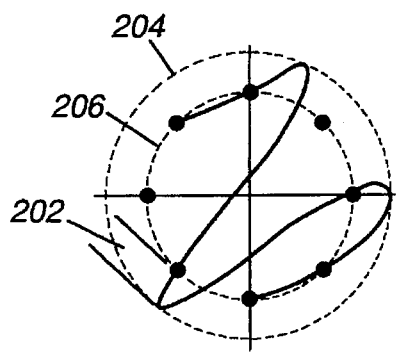
FIG. 2 shows the magnitude and phase trajectory of a complex baseband signal of the communication device of FIG. 1.
Figure 3:
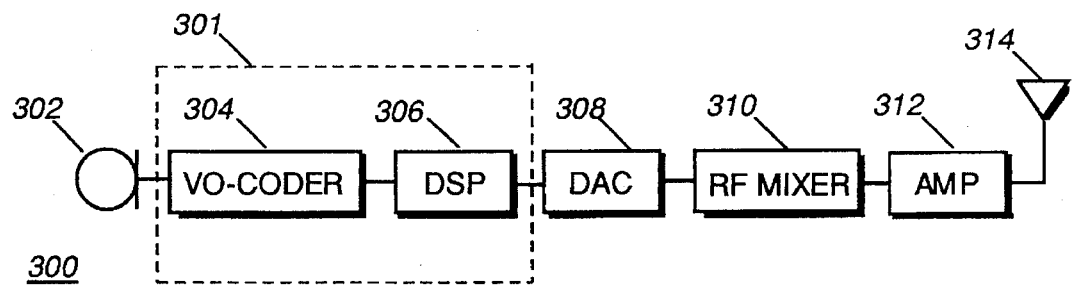
FIG. 3 shows relevant portions of a communication device in accordance with the present invention.

Referring to FIG. 3, relevant components of a communication device 300 in accordance with the present invention are shown. A microphone 302 produces an analog signal which is coupled to a vo-coder 304 where it is converted to a digital signal. The vo-coder 304 generates a digital information signal and applies it to a Digital Signal Processor (DSP) 306. The DSP 306 manipulates this digital information signal in accordance with the principles of the present invention. The function of this DSP 306 will be discussed in more detail in association with FIG. 4. The combination of the vo-coder 304 and the DSP 306 form a digital modulator 301. The processed signal at the output of the DSP 306 is coupled to a digital to analog converter 308 where the signal is converted back to analog before being applied to an RF mixer 310. This mixer 310, which could be a quadrature mixer, mixes the analog signal with a locally generated oscillator signal (LO). The output of the mixer is coupled to an amplifier 312 which amplifies the mixed signal before it is transmitted via an antenna 314.

Figure 4:
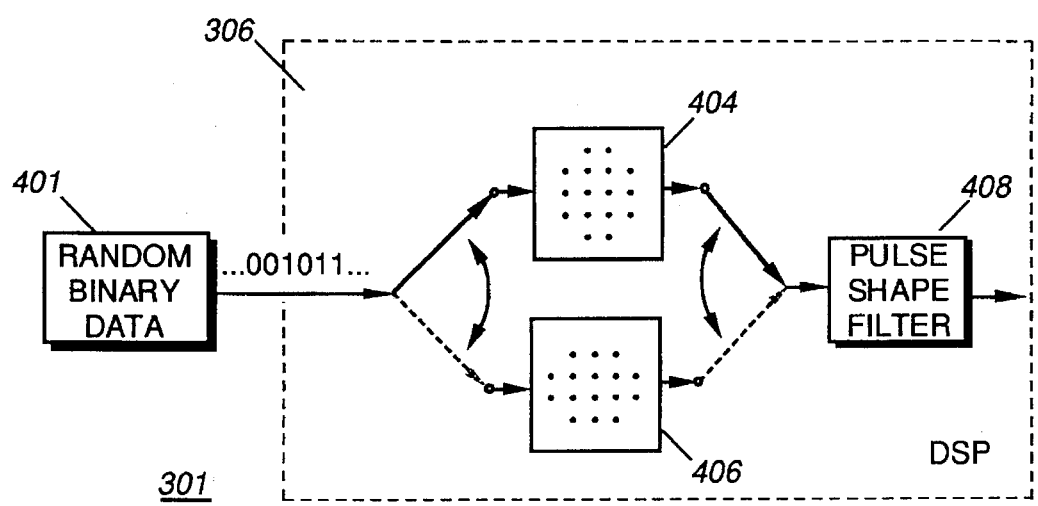
FIG. 4 shows the elements of a signal processor in accordance with the present invention.

Referring to FIG. 4, essential elements of the DSP 306 in accordance with the present invention are shown. In essence, a random binary data generator 401 is shown coupled to a signal processor 402. The generator 401 may be any source of digital data such as the vo-coder 304. The processor 402 includes first and second symbol mapping sections 404 and 406. The digital information generated at 40 1 is alternately mapped onto a first or second constellation diagram 404 to produce data symbols each having a symbol interval. In the preferred embodiment, the first and second constellation diagrams are asymmetric and shifted by 90° from one another. These data symbols are represented via vectors each having I and Q signal components. In other words, the data symbols are represented by orthogonal vector components. The I and Q signal components collectively represent the magnitude and the phase of each of the vectors. Each vector represents a symbol interval whose content is determined by the number of bits that are processed at each instant of time. For instance, in a three bit system, a vector represents three bits with eight distinct magnitude and phase possibilities. In a four bit system, a vector represents four bits and the signal constellation has sixteen symbol locations thereon. In the preferred embodiment and in order to facilitate the understanding of the principles of the present invention, a four bit symbol interval is assumed.

The symbols are arranged onto the constellation diagrams 404 and 406 and are processed alternately therefrom. This alternate processing of the symbols minimizes overshoot at the subsequent filtering step. In effect, this alternate processing of the symbols minimizes the peak to average power ratio of the amplifier 312. The step of filtering is performed via a pulse shape filter 408. The aim of this filter is to reduce high frequency components of the symbols before they are transmitted, thereby securing that the transmitted waveform does not interfere with other signals occupying nearby frequency channels. Due to its characteristics, however, this filter 408 tends to produce signal peaks during transitions from one symbol to another. These signal peaks translate into additional peak power demands on the amplifier 312. The magnitude of these peaks depends on both the filter characteristics and the phase and magnitude of the successive symbols in the transmitted symbol sequences. The present invention seeks to use at least two asymmetric constellation diagrams to minimize the impact these signal peaks have on the peak to average power ratio. This scheme relieves the amplifier 312 from having to operate at unnecessary peaks while maintaining system integrity.

Figure 5:
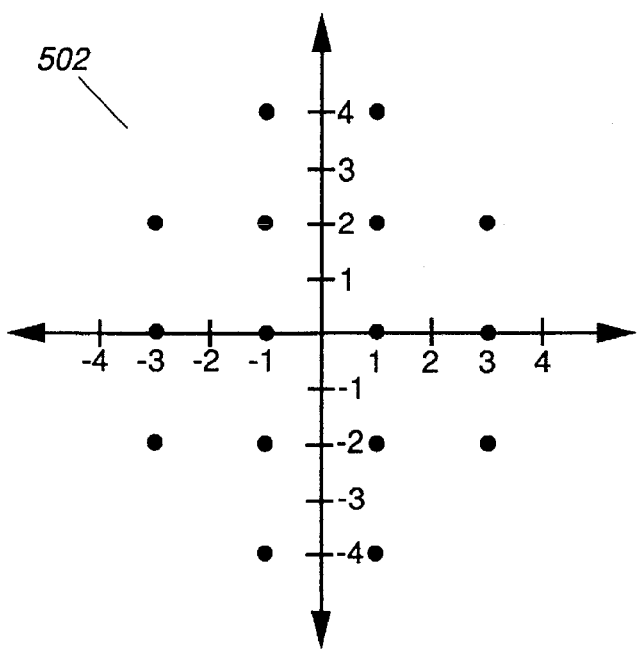
FIG. 5 shows two alternate constellation diagrams in accordance with the present invention.
Figure 5:
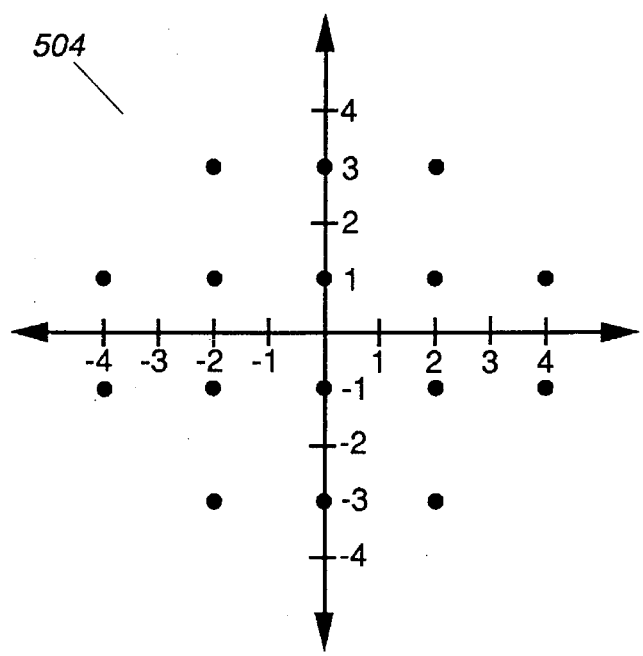

In accordance with the present invention, a pair of 16 symbol constellations 502 and 504 are shown in FIG. 5. These two constellations 502 and 504 are utilized in an alternating manner to reduce the peak-to-average power ratio of the amplifier 312. In other words, the digital information is mapped onto 502 and 504 alternately. The manner in which the two constellations are used is graphically shown in FIG. 4. The DSP 306 processes the symbols from diagrams 502 and 504, alternately. The two diagrams 502 and 504 are asymmetric and are shifted in phase by 90° from each other. This relationship avoids the transmission of a pair of successive symbols which are large in magnitude and similar in phase. Another problem avoided by this scheme is the transmission of an alternating pattern of symbols in which the successive symbols are both large in magnitude and phase shifted by approximately 180°. Both of these problems contribute significantly to producing a large peak-to-average power ratio. Yet another benefit of this approach is that both constellations 502 and 504 maintain a distance of 2 between adjacent symbol points which is identical to the single square 16 symbol constellation and thereby maintains the error performance of the square constellation. In addition, the two constellations 502 and 504 require an average power that is identical to the square 16 symbol constellation.

To observe the improvements offered by the alternating scheme of the present invention, one could plot the peak-to-average ratio of both an alternating 16-QAM scheme and a conventional 16-QAM signaling as a function of rolloff of the transmit root raised cosine rolloff filter. Such a plot will demonstrate that the alternating scheme is able to achieve approximately a 0.9 dB reduction in peak-to-average power ratio.

It is straightforward to derive the expressions for the probability of symbol error for both of these 16-QAM schemes for an Additive White Gussian Noise (AWGN) channel. The probability of symbol error ($P^S_M$), for conventional 16-QAM is given by $$P_M^S = 1 - \left[ 1 - \frac{12}{16} \, erfc\left(\sqrt{\frac{\gamma_b}{10}}\right) \right]^2$$

while the probability error ($P_M^A$), for alternating 16-QAM is given by $$P_M^A = 1 - \left[ 1 - \frac{11}{16} \, erfc\left(\sqrt{\frac{\gamma_b}{10}}\right) \right] \cdot \left[ 1 - \frac{12}{16} \, erfc\left(\sqrt{\frac{\gamma_b}{10}}\right) \right]$$

where, $$erfc(x) = \frac{2}{\pi} \int_x^\infty e^{-t^2} dt$$

and $$\gamma_b = \frac{E_b}{N_0}$$

is the average bit energy-to-noise density, where $E_b$ is the average bit energy and $N_0$ represents the noise power spectral density. Computer simulations have demonstrated that the probability of symbol error for conventional 16-QAM and the alternating 16-QAM scheme are nearly identical. The alternating 16-QAM scheme does provide a slight advantage that can be expressed in dB. This advantage can be illustrated by plotting the additional dB that conventional 16-QAM must expend to achieve the equivalent probability of symbol error as the alternating 16-QAM scheme.

Reference is made to the following mathematical equations in order to evaluate the spectral content of an alternating system. The Power Spectral Density (PSD) for a random process y(t) is given by $$|y(f)|^2 = \lim_{T \to \infty} \left( \frac{E[|Y_T(f)|^2]}{T} \right)$$

$$Y_T(f) = \int_{-\infty}^{\infty} y_T(t) e^{-j2\pi f t} dt$$

$$y_T(t) = \begin{pmatrix} y(t), |t| < T/2 \\ 0, \text{elsewhere} \end{pmatrix}$$

Proceeding with the solution for $|Y(f)|^2$, if the random process is just the sum of time delayed versions of the same pulse shape scaled by some random amplitude it can be written as $$y_T(t) = \sum_{m=-N}^{N} a_m p(t - mT_s)$$

where $(N+\frac{1}{2})T_s = T/2$ and the $\{\alpha_m\}$ represent the random amplitude levels that excite each pulse. Then $$y_T(t) = \sum_{m=-N}^{N} a_m p(t - mT_s) e^{-2\pi m f T} dt = P(f) \sum_{m=-N}^{N} a_m e^{-2\pi m f T_s}$$

where P(f) is the Fourier Transform of the pulse, p(t). Continuing with the analysis $$|Y(f)|^2 = \lim_{T \to \infty} \left( \frac{1}{T} |P(f)|^2 E\left[ \left| \sum_{m=-N}^{N} a_m e^{-2\pi m f T_s} \right|^2 \right] \right) =$$

$$|p(f)|^2 \lim_{T \to \infty} \left( \frac{1}{T} \sum_{m=-N}^{N} \sum_{n=-N}^{N} E[a_m a_n] e^{j(m-n)\pi f T_s} \right)$$

and since $$E[a_m a_n] = E[a_m^2]$$

for independent and identifically distributed random variables the following simplification results $$|Y(f)|^2 = (E[a_m^2])|P(f)|^2 \lim_{T \to \infty} \left( \frac{1}{T} \sum_{m=-N}^{N} 1 \right)$$

Finally, using the fact that $$T = 2\left( N + \frac{1}{2} \right) T_S$$

leads to $$|S(f)|^2 = (E[a_m^2])|p(f)|^2 \lim_{N \to \infty} \left[ \frac{2N+1}{(2N+1)T_d} \right] = \frac{E[a_m^2]}{T_s} |P(f)^2|$$

This result can be utilized to determine the PSD of the QAM signal by using the fact that the I and Q components of the signal are independent and orthogonal. Hence, the PSD can be found by applying the above equation to the I and Q signal components separately and then summing the two results to yield the composite signal PSD.

As previously stated the QAM symbols are represented by $d_k = x_k + jy_k$ and the average symbol power in each component of conventional square 16-QAM is given by $$E[x_k^2] = E[y_k^2] = 5$$

and the PSD is given by $$|S^C(f)|^2 = \frac{E[x_k^2] + E[y_k^2]}{T_s} |P(f)|^2 = \frac{10}{T_s} |P(f)|^2$$

The average power in each component of the alternating scheme is different and given by $$E^I[x_k^2] = 4$$

$$E^Q[x_k^2] = 6$$

where the constellation 502 in FIG. 5 has been used without loss of generality. Hence, the PSD of the alternating 16-QAM scheme is given by $$|S^A(f)|^2 = \frac{E[x_k^2] + E[y_k^2]}{T_s} |p(f)|^2 = \frac{10}{T_s} |p(f)|^2$$

Thus, as can be seen, the alternating 16-QAM scheme has the same PSD as the conventional 16-QAM signaling scheme.

Simply stated, the alternating 16-QAM scheme disclosed herein provides approximately a 1 dB reduction in peak-to-average power ratio with respect to conventional 16-QAM that utilizes a square 16 symbol signal constellation. It has been shown that the alternating 16-QAM scheme has an identical PSD as that of the conventional 16-QAM signaling scheme. In addition, the alternating scheme provides a slight sensitivity gain with respect to the conventional 16-QAM scheme in an AWGN channel.

Figure 6:
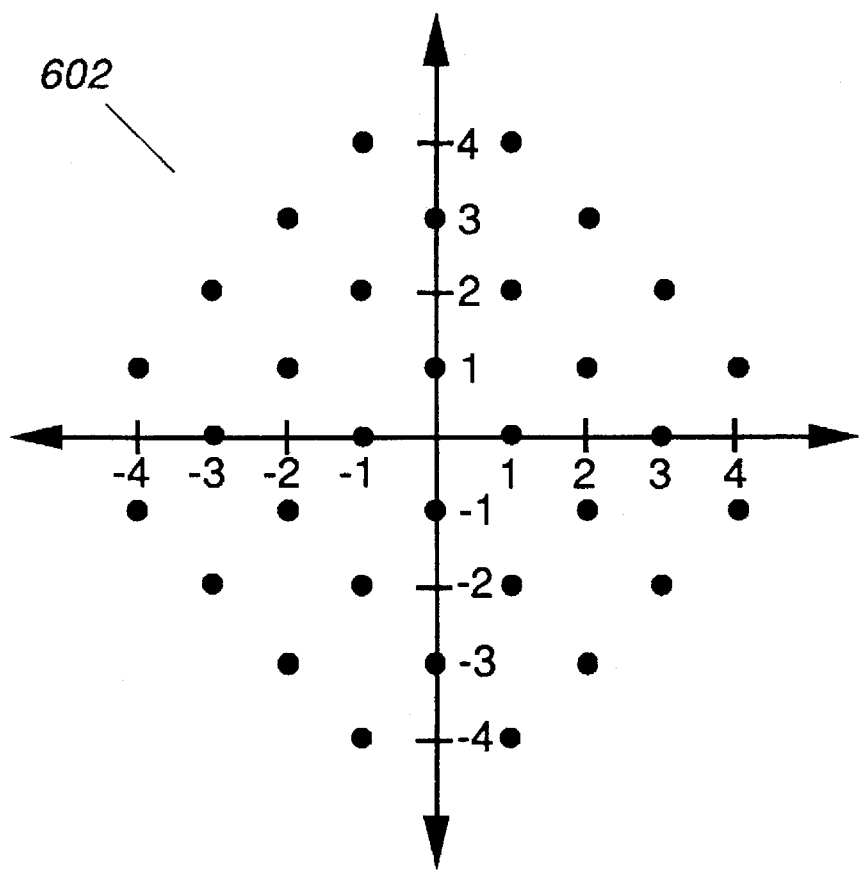
FIG. 6 shows a constellation diagram in accordance with the present invention.

In an alternative embodiment, the peak suppression system maps the digital information onto a constellation diagram having twice the number of symbols required to represent the digital information signal in order to produce data symbols each having a symbol interval. This constellation diagram 602 is shown in FIG. 6. The symbols on the constellation diagram 602 are then grouped in to two sets of equal size which are shifted by 90° from one another. Once the data symbols have been grouped, they are alternately picked from the two sets in order to minimize the peak to average power ratio.

In summary, the principles of the present invention reduce the peak-to-average ratio of a communication device by utilizing more than one constellation diagram. This approach takes benefit of the fact that the worst offending symbol sequences contain the corner symbols. These symbols have the largest magnitude and therefore produce filtered symbol responses with the largest magnitude ringing. When a sequence of corner symbols alternate in phase by approximately 180 degrees and/or maintain nearly identical phase, the ringing associated with each filtered symbol combines to generate large fluctuations in the transmitted signal magnitude. The magnitude fluctuations of the transmitted signal are not as severe when the sequence of corner symbols does not alternate in phase by 180 degrees and/or remain at nearby constant phase. The present invention overcomes this problem by using more than one constellation diagram.

It can be appreciated that a constellation scheme that avoids transmitting a sequence of large magnitude symbols that alternate in phase by 180° would transmit symbols along one axis during odd symbol times and would transmit symbols along a perpendicular axis during even symbol times. In a 2-dimensional signal constellation this technique would guarantee that two successive large magnitude symbols could not differ by 180° because one axis is rotated 90° from the other axis.

What is claimed is:

1. A digital modulator for use in a communication device with improved peak to average power ratio, comprising:
   a digital information generator;
   a processor responsive to the digital information generator to alternately map the digital information onto a first or a second constellation diagram to produce data symbols each having a symbol interval, the first and second constellation diagrams are asymmetric; and
   means for processing the data symbols alternately from the first and second constellation diagrams in order to minimize the peak to average power ratio.

2. The digital modulator of claim 1, wherein the processor includes a digital signal processor.

3. The digital modulator of claim 1, wherein the means for processing includes a pulse shape filter.

4. The digital modulator of claim 1, wherein the digital information generator includes a vo-coder.

5. A digital modulator for use in a communication device with improved peak to average power ratio, comprising:
   a digital information generator;
   a processor responsive to the digital information generator to map the digital information onto a constellation diagram having twice the number of symbols required to represent the digital information signal in order to produce data symbols each having a symbol interval, the symbols on the constellation diagram are grouped asymmetrically in to two sets of equal size which are shifted by 90° from one another; and
   means for processing the data symbols alternately from the two sets in order to minimize the peak to average power ratio.

6. A digital modulator for use in a communication device with improved peak to average power ratio, comprising:
   a digital information generator for generating digital information;
   a processor responsive to the digital information generator to alternately map the digital information onto a first or a second constellation diagram to produce data symbols each having a symbol interval, the first and second constellation diagrams each having a pair of perpendicular axes, a first set of data symbols are arranged along one axis in the first constellation diagram while a second set of data symbols are arranged along the perpendicular axis in the second constellation diagram; and
   means for processing the data symbols alternately from the first and second constellation diagrams in order to minimize the peak to average power ratio.

7. The digital modulator of claim 6, wherein the means for processing includes a pulse shape filter.

8. The digital modulator of claim 6, wherein the first and second constellation diagrams include equal number of data symbols.

* * * * *